UNITED STATES PATENT OFFICE.

ERNST WALDEMAR JUNGNER, OF KNEIPPBADEN, SWEDEN.

PROCESS OF PRODUCING ALKALI CARBONATE AND HYDRAULIC CEMENT FROM ALKALIFEROUS SILICATE MINERALS.

1,357,873.      Specification of Letters Patent.      Patented Nov. 2, 1920.

No Drawing.      Application filed September 9, 1916. Serial No. 119,317.

*To all whom it may concern:*

Be it known that I, ERNST WALDEMAR JUNGNER, a citizen of the Kingdom of Sweden, residing at Kneippbaden, Sweden, have invented a new and useful Improved Process of Producing Alkali Carbonate and Hydraulic Cement from Alkaliferous Silicate Minerals, of which the following is a specification.

As is well known, feldspar and other alkaliferous silicate minerals, may be split up by means of lime or calciferous substances, if the minerals in a finely divided state are mixed with the lime and the mixture is then heated to a temperature of 1000° C. or more. By this process alkali-lime-aluminosilicates are formed, the composition of which may be stated empirically by the following general formula:

$$K_2O(Na_2O)(CaO)_m(Al_2O_3)_n(SiO_2)_p$$

wherein "m," "n" and "p" represent variable numbers of molecules, differing in different minerals. In said combinations part of the alumina is generally replaced by iron sesquioxid and part of the lime is replaced by magnesium oxid (MgO) or other basic oxids of bivalent metals.

In the mixture produced as above the alkali ($K_2O$ or $Na_2O$) is loosely bound, and the chemical combination is the looser the more the percentage of lime (the basicity) is increased and also the more the temperature is raised. Thus, after cooling the mixture, a greater or lesser part of the alkali may, as is well-known, be split off and dissolved in water.

If, on the contrary, the temperature be raised to 1400° C. or more (which temperature, however, is somewhat variable in case of alkali-minerals of various composition) a reaction, as is well-known, sets in by which the alkalis are driven out by the lime and volatilized.

A complete expulsion of the alkali according to said simple reaction has, however, proved to meet with certain practical inconveniences. This circumstance is highly disadvantageous, especially in case of a simultaneous manufacture of cement, since the cement will be useless, should not the alkalis be removed, substantially, completely, which requires a comparatively strong and lengthy burning and a wasting of fuel. To this may be added also other inconveniences.

I have found that said inconveniences may be prevented, if to the mixture of lime and feldspar be added a third reagent consisting of finely divided carbon or carbonaceous matters. Thereby the alkali may be driven out more easily and completely.

I cannot explain this advantageous action of the carbon otherwise than that the carbon reacts chemically with the other substances, while quite special chemical reactions widely different from the aforesaid simple reactions take place.

It might be imagined that the pores left by the carbon particles in the raw material after the burning would facilitate to some extent the volatilization of the alkali; but this explanation is not in my opinion satisfactory.

On the other hand it is very difficult if not impossible to prove indisputably in a purely experimental way the occurrence of said reactions.

The invention is described below under the very probably presupposition that a chemical action of the finely divided carbon takes place.

Long ago a process of producing the alkali metals was used according to the following well-known formula:

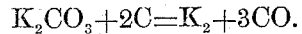
$$K_2CO_3 + 2C = K_2 + 3CO.$$

This reaction requires, as is well-known, heating to light red heat (about 1200° C).

In the heated mixture of lime and an alkaliferous silicate mineral described above the alkali occurs, as is mentioned, in a very loosely bound form.

If the heating be effected in open fire, *i. e.* in an atmosphere of burning gases containing carbonic acid (for instance in furnaces used in the cement manufacture) and if to the mixture be added a suitable quantity of finely divided carbon or carbonaceous material, the following substances are obtained:

(1) Loosely bound alkali ($K_2O, Na_2O$),
(2) Carbonic acid, $CO_2$;
(3) Carbon.

Said substances react with one another according to the following chemical formula:

$$K_2O + CO_2 + 2C = K_2 + 3CO \quad (1)$$

As will appear it is very probable that said reactions will take place, owing to the chemical affinity of the carbon even before the temperature is attained at which the alkali, according to the simple reaction previously known, is split off by the lime and volatilized. Under the predisposition of the carbon, the alkali oxid and the carbonic acid are to be considered as combined beforehand to carbonate, although this is not the case in reality. Consequently, it will be seen that the reaction (1) is substantially identical with that described above for producing the alkali metals from the carbonates and carbon.

The volatilized alkali metal then combines with further quantities of carbonic acid to carbonate according to the formula:

$$K_2 + 2CO_2 = K_2CO_3 + CO \quad (2)$$

Thus, the above reactions may be combined to a single reaction according to the formula:

$$K_2O + 3CO_2 + 2C = K_2CO_3 + 4CO \quad (3)$$

Provided that, for instance, alkaliferous feldspar (orthoclase) and calcium carbonate be used in a pure state, the reaction summarily brought together will be as follows:

$$K_2O.Al_2O_3.6SiO_2 + CaCO_3 + 3CO_2 + 2C = CaO.Al_2O_3.6SiO_2 + K_2CO_3 + 4CO + CO_2 \quad (4)$$

In practice, however, preferably five times the weight of lime (CaO) equivalent to the alkali is to be used. Under such conditions the composition of the raw material will be as follows:

$$K_2O.Al_2O_3.6SiO_2 + 5CaCO_3 + 2C,$$

and from this it will appear that the percentage of carbon should amount to at least about 2.5%. In practice, however, preferably a quantity of carbon amounting to 4 to 10% of the total quantity of raw materials is to be used.

On using larger quantities of carbon than required by the above reaction, of course, the superfluous quantity will be burned to carbonic acid, which in taking part, as will appear from the reaction, wholly or in part in the reaction predisposes to the starting thereof.

The reaction proceeds the more rapidly and completely the finer the carbon is divided. When using coke, pit coal, anthracite, charcoal or the like, said materials are to be ground so finely that they will pass a sieve having 5000 meshes per square-centimeter.

Instead of coal a suitable carbonaceous substance (an organic substance) as for instance saw-dust or the like may be used.

Instead of an alkaliferous silicate mineral which, of course, also includes rocks containing such minerals, incompletely weathered products of such minerals and rocks, as alkaliferous clays, slate, etc., may be used.

Obviously, the carbonic acid combined with the lime is driven off, before the reaction described above takes place and, consequently, does not take part in the reaction.

If hydraulic cement (Portland cement) is to be produced simultaneously with the alkali, so large a quantity of lime—CaO—is to be used, that the proportion between the lime and the total percentage of silica and sesquioxids of the mixture (the so-called hydraulic index $$\frac{CaO}{SiO_2 + Al_2O_3 + Fe_2O_3})$$

amounts to at least 1.7. Preferably, however, the said index amounts in practice to about 2.1. Provided that pure ingredients be used, the reaction and the relative quantities will be about as follows:

$$K_2O.Al_2O_3.6SiO_2 + 17CaCO_3 + 3CO_2 + 2C = 17CaO.Al_2O_3.6SiO_2 + K_2CO_3 + 4CO + 17CO_2.$$

As will appear from said equation, the quantity of carbon required for the reaction—it being supposed that the carbonic acid is obtained from the furnace fuel—amounts, theoretically taken, to about 1.5% of the raw mixture. Preferably, however, as mentioned above, a larger quantity of carbon is to be used, which quantity may amount to at least 4% of the weight of the raw mixture. Of course, the quantity of the furnace fuel may in such case be correspondingly decreased.

In case the alkaliferous silicate minerals contain a disproportionately large quantity of free silica in the form of quartz, in which case the so-called silicate index (the proportion between the silica—$SiO_2$— and the total percentage of sesquioxids: $Al_2O_3 + Fe_2O_3$) becomes too high, small quantities of iron-oxids (iron-ore) or substances having a large percentage of alumina (as bauxite, etc.) are, preferably, added, said procedure being well-known in the cement industry.

Of course, in the present process, the temperature is to be raised to such a degree and the burning is to be carried on during so long a time, that a well-burnt cement is obtained. For this purpose, according to the circumstances, temperatures of about 1250° to 1450° C. are required.

Whether cement is to be produced simultaneously or not, the process is, preferably, carried on in furnaces of the same construction as those commonly used in cement manufacture. The alkali carbonate is then driven off as a finely divided fume which, preferably, is collected and recovered in such manner that the burning gases—preferably after cooling—are in any manner brought into intimate contact with water, whereafter the alkali-carbonate taken up by the water is recovered by evaporation of the solution.

In case the process is carried on in shaft furnaces, the raw material should be previously briqueted. This may, preferably, be effected by moistening the raw mixture with milk of lime (slaked lime puddled in water) to form a firm paste which is then briqueted in any suitable manner.

In carrying out the process electric furnaces of any suitable construction may also be used; in this case, however, carbonic acid or—if the percentage of carbon of the briquets be sufficient—an adequate quantity of air is to be supplied.

Having now described my invention, what I claim as new and desire to secure by Letters Patent is:

1. Process of producing alkali carbonate, consisting essentially in heating in the absence of calcium compounds of mineral acids an intimate mixture of an alkaliferous igneous mineral substance, a calcareous material consisting essentially of a basic compound of calcium and finely divided carbonaceous matters in presence of carbon dioxid until the alkali is fumed off and the residue is in a sintered state, and recovering the alkali compound evolved in the heat treatment.

2. Process of producing alkali carbonate, consisting essentially in heating in the absence of calcium compounds of mineral acids an intimate mixture of a double silicate of aluminium and an alkali metal, a calcareous material consisting essentially of a basic compound of calcium and finely divided carbonaceous matters in presence of carbon dioxid until the alkali is fumed off and the residue is in a sintered state, and recovering the carbonate of alkali evolved in the heat treatment.

3. Process of producing carbonate of potash, consisting essentially in heating in the absence of calcium compounds of mineral acids an intimate mixture of an igneous mineral substance containing potash, a calcareous material consisting essentially of a basic compound of calcium and finely divided carbonaceous matters in an atmosphere containing carbon dioxid until the alkali is fumed off and the residue is in a sintered state, and recovering the alkali compound evolved in the heat treatment.

4. Process of producing alkali carbonate, consisting essentially in heating in the absence of calcium compounds of mineral acids an intimate mixture of an igneous mineral containing an alkali oxid, a calcareous material consisting essentially of a basic compound of calcium containing at least sufficient calcium oxid to replace said alkali oxid, and finely divided carbonaceous matters until the alkali is fumed off as carbonate of alkali and the residue is in a sintered state, and recovering the alkali compound evolved in the heat treatment.

5. Process of producing alkali carbonate, consisting in reacting in the absence of calcium compounds of mineral acids upon an alkaliferous material, consisting essentially of a double silicate of aluminium and an alkali metal, with a calcareous material consisting essentially of a basic compound of calcium in presence of finely divided carbon and carbon dioxid at a temperature sufficient to expel the alkali and cause it to combine with carbon dioxid, and recovering the alkali compound evolved.

6. Process of producing alkali carbonate, consisting in heating in the absence of calcium compounds of mineral acids a charge composed substantially of carbonate of calcium, a mineral containing essentially a double silicate of aluminium and a metal of the alkalis, and finely divided carbonaceous matters in an atmosphere containing carbon dioxid, until the alkali is fumed off, and recovering the fumes of alkali compounds evolved in the heat treatment.

7. Process of simultaneously producing alkali carbonate and hydraulic cement, which consists essentially, in heating in the absence of calcium compounds of mineral acids a mixture of finely divided carbonaceous matters and a raw cement mixture consisting essentially of a basic compound of calcium and a double silicate of aluminium and an alkali metal in an atmosphere containing carbon dioxid until the alkali is fumed off and the residue forms sintered cement clinker, and collecting the alkali compound and the cement clinker separately.

8. Process of simultaneously producing alkali carbonate and hydraulic cement, which comprises reacting upon igneous mineral substance containing a silicate of an alkali metal with a basic calcium compound in absence of calcium compounds of mineral acids and in presence of finely divided carbon and carbon dioxid, until the alkali is volatilized and the residue forms sintered cement clinker, and separately collecting the residue and the volatilized material.

9. Process of simultaneously producing alkali and hydraulic cement, which comprises reacting upon an igneous mineral substance containing a double silicate of aluminium and an alkali metal with a calciferous material of basic nature in absence of calcium compounds of mineral acids and in presence of finely divided carbon and carbon dioxid, until the alkali is liberated and fumed off and the residue forms sintered cement clinker, and separately collecting the residue and the alkali compound.

10. Process of producing alkali carbonate consisting essentially in forming an intimate mixture of finely ground alkaliferous mineral substance, a finely ground basic compound of calcium and finely divided carbonaceous material briqueted by milk of lime, heating the mixture in the presence of carbon dioxid until the alkali is fumed off and the residue is in a sintered state and recovering the fume.

In testimony whereof I have signed my name in presence of two subscribing witnesses.

ERNST WALDEMAR JUNGNER.

Witnesses:
   T. BOIJE,
   Y. BERGLUND.